(12) United States Patent
Kim et al.

(10) Patent No.: US 8,714,804 B2
(45) Date of Patent: May 6, 2014

(54) BACKLIGHT ASSEMBLY AND DISPLAY APPARATUS HAVING THE SAME

(75) Inventors: Guk-Hyun Kim, Yongin-si (KR); Moon-Gyu Lee, Suwon-si (KR); Hyun-Deok Im, Seongnam-si (KR)

(73) Assignee: Samsung Display Co., Ltd, Yongin, Gyeonggi-Do (KR)

( * ) Notice: Subject to any disclaimer, the term of this patent is extended or adjusted under 35 U.S.C. 154(b) by 255 days.

(21) Appl. No.: 13/275,048

(22) Filed: Oct. 17, 2011

(65) Prior Publication Data
US 2012/0106193 A1 May 3, 2012

(30) Foreign Application Priority Data
Oct. 29, 2010 (KR) .......................... 10-2010-0106422

(51) Int. Cl.
*F21V 7/04* (2006.01)
(52) U.S. Cl.
USPC .......................................... 362/616; 362/628
(58) Field of Classification Search
USPC ......... 362/601, 607–610, 615, 616, 623, 625, 362/612, 613, 628
See application file for complete search history.

(56) References Cited

U.S. PATENT DOCUMENTS

| 6,036,328 | A * | 3/2000 | Ohtsuki et al. ............... 362/612 |
| 7,311,431 | B2 * | 12/2007 | Chew et al. ................... 362/613 |
| 2007/0171493 | A1 * | 7/2007 | Nakanishi ....................... 359/15 |
| 2008/0101068 | A1 * | 5/2008 | Kitamura et al. ............. 362/246 |
| 2009/0135623 | A1 * | 5/2009 | Kunimochi .................... 362/608 |
| 2012/0063166 | A1 * | 3/2012 | Panagotacos et al. ........ 362/609 |
| 2012/0106196 | A1 * | 5/2012 | Cho et al. ...................... 362/609 |

FOREIGN PATENT DOCUMENTS

| JP | 11-174443 | 7/1999 |
| JP | 2004-319364 | 11/2004 |
| KR | 100230150 | 8/1999 |
| KR | 1020050010822 | 1/2005 |
| KR | 1020080111646 | 12/2008 |

* cited by examiner

*Primary Examiner* — Julie Bannan
(74) *Attorney, Agent, or Firm* — F. Chau & Associates, LLC (57) ABSTRACT

The backlight assembly includes a light source part and a light guide plate. The light source part generates a first light beam. The light guide plate has a plurality of light guide blocks. Each of the light guide blocks has a light incident surface, an opposite surface, a light emitting surface, and an inclined surface. The light incident surface receives the first light beam. The opposite surface is located opposite to the light incident surface, has a convex shape with respect to the light incident surface, and reflects the first light beam and converts the first light beam into a second light beam. The light emitting surface emits the second light beam. The inclined surface is inclined with respect to the light emitting surface.

19 Claims, 11 Drawing Sheets

BACKLIGHT ASSEMBLY AND DISPLAY APPARATUS HAVING THE SAME

CROSS-REFERENCE TO RELATED APPLICATION

This application claims priority under 35 U.S.C. §119 to Korean Patent Application No. 2010-106422, filed on Oct. 29, 2010 in the Korean Intellectual Property Office (KIPO), the contents of which are herein incorporated by reference in their entirety.

BACKGROUND

1. Technical Field

Exemplary embodiments of the present invention relate to a backlight assembly and a display apparatus having the backlight assembly. More particularly, exemplary embodiments of the present invention relate to a backlight assembly providing collimated light and a display apparatus having the backlight assembly.

2. Discussion of the Related Art

Generally, a display apparatus includes a display panel and a backlight assembly. Backlight assemblies are classified into direct-illumination backlight assemblies directly providing the display panel with light and edge-illumination backlight assemblies providing the display panel with light through a light guide plate.

An edge-illumination backlight assembly includes a light guide plate that has an incident surface adjacent to which a line light source, such as a cold cathode fluorescent lamp (CCFL), or a point light source, such as a light emitting diode (LED), is disposed, an opposite surface that is positioned opposite to the incident surface and receives light from the light source, a light emitting surface through which light is emitted, and a reflecting surface on which light is reflected.

However, in the edge-illumination backlight assembly, light emitted from the line light source or the point light source is reflected on the opposite surface and the reflecting surface. Light emitted from the light source in the edge illumination backlight assembly has a wide emitting angle that renders it difficult to employ the edge illumination backlight assembly for an active viewing angle liquid crystal display apparatus (LCD), a color-filterless LCD, and a stereoscopic LCD which employ collimated light having a narrow emitting angle.

SUMMARY

Exemplary embodiments of the present invention provide a backlight assembly providing collimated light and a display apparatus having the backlight assembly.

According to an exemplary embodiment of the present invention, the backlight assembly includes a light source part and a light guide plate. The light source part generates a first light beam. The light guide plate has a plurality of light guide blocks. Each of the light guide blocks has a light incident surface, an opposite surface, a light emitting surface, and an inclined surface. The light incident surface receives the first light beam. The opposite surface is opposite to the light incident surface, has rounded portion, such as, for example, a convex shape with respect to the light incident surface, and reflects the first light beam and converts the first light beam into a second light beam that is collimated. The light emitting surface emits the second light beam. The inclined surface is inclined with respect to the light emitting surface.

According to an exemplary embodiment of the present invention, the display apparatus includes a backlight assembly and a display panel. The backlight assembly comprises a light source part and a light guide plate. The light source part generates a first light beam. The light guide plate has a plurality of light guide blocks. Each of the light guide blocks has a light incident surface, an opposite surface, a light emitting surface, and an inclined surface. The light incident surface receives the first light beam. The opposite surface is opposite to the light incident surface, has a rounded portion, such as, for example, a convex shape with respect to the light incident surface, and reflects the first light and converts the first light into a second light beam that is collimated. The light emitting surface emits the second light beam. The inclined surface is inclined with respect to the light emitting surface. The display panel is disposed over the backlight assembly and displays an image.

According to an embodiment of the present invention, a light guide plate has an opposite surface opposite to an incident surface and having a concavo-convex shape, so that light provided through the incident surface may be converted into collimated light. Thus, a viewing angle of the display apparatus may be easily controlled and a stereoscopic image may be easily embodied.

According to an embodiment, the light guide plate is divided into a plurality of light guide blocks, so that a size of a bezel may be effectively decreased.

According to an embodiment, a light source disposed adjacent to the first light guide block provides light to at least one of a first light guide block and a second light guide block adjacent to the first light guide block, so that the viewing angle may be variously controlled.

BRIEF DESCRIPTION OF THE DRAWINGS

The embodiments of the present invention will become more apparent by reference to the following detailed description when considered in conjunction with the accompanying drawings, in which.

DETAILED DESCRIPTION

Hereinafter, exemplary embodiments of the present invention will be described in detail with reference to the accompanying drawings, wherein the same numbers may be used to denote the same or substantially the same elements throughout the drawings and the specification.

Figure 1:
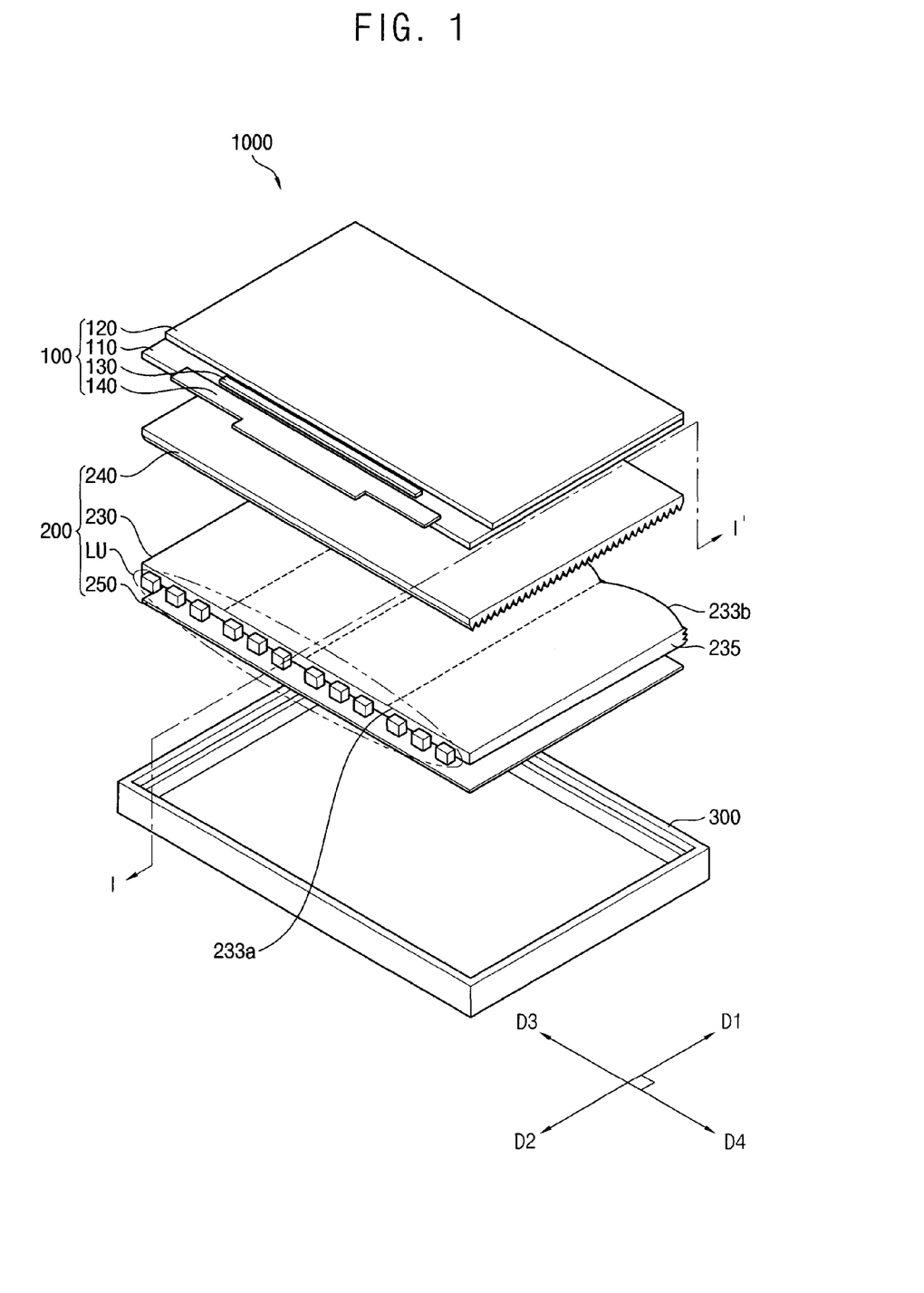
FIG. 1 is an exploded perspective view illustrating a display apparatus according to an exemplary embodiment of the present invention.
Figure 2:
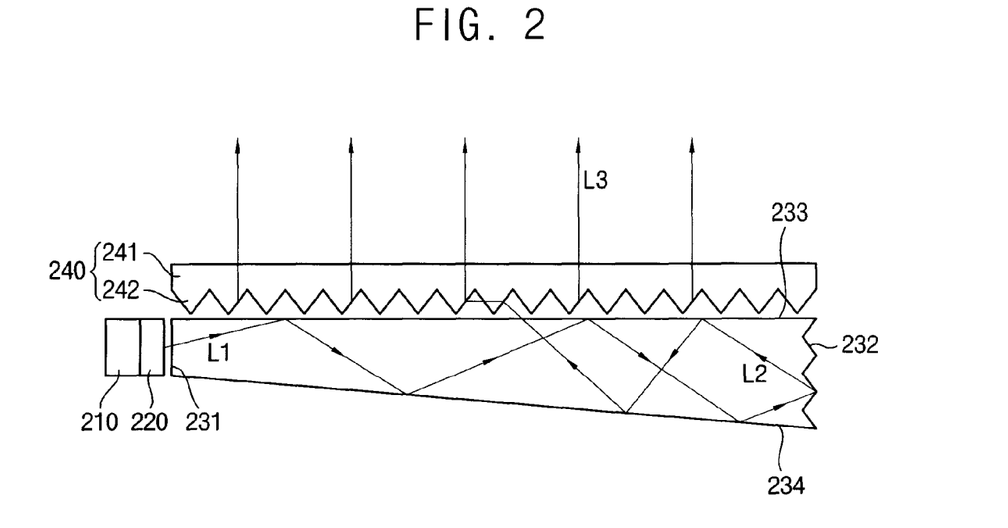
FIG. 2 is a cross-sectional view taken along a line I-I' of FIG. 1.

FIG. 1 is an exploded perspective view illustrating a display apparatus according to an exemplary embodiment of the present invention. FIG. 2 is a cross-sectional view taken along a line I-I' of FIG. 1.

Referring to FIGS. 1 and 2, a display apparatus 1000 according to an embodiment of the present exemplary embodiment includes a display panel 100, a backlight assembly 200, and a receiving container 300.

The display panel 100 includes a first substrate 110, a second substrate 120 opposite to the first substrate 110, a driving part 130 that drives gate lines (not shown) and data lines (not shown) and is formed between the first and second substrates 110 and 120, and a printed circuit board 140. The first substrate 110 includes a color filter layer.

The backlight assembly 200 includes a light source unit LU, a light guide plate 230, and a conversion film 240. According to an embodiment, the backlight assembly may further include a reflecting plate 250.

The light source unit LU includes a light source part 210 and a light source lens part 220.

The light source part 210 includes a plurality of light source groups. Each of the light source groups includes a plurality of light sources. The light sources are disposed adjacent to an incident surface 231 of the light guide plate 230 and emit the light. The light sources may be point light sources emitting light having a color. Alternately, the light sources may be point light sources emitting light having colors different from each other.

The light source lens part 220 is disposed between the light source part 210 and the light guide plate 230. The light source lens part 220 refracts light provided from the light sources so that a first light beam L1 is incident onto the incident surface 231. According to embodiments, the light source lens part 220 may have various shapes to control an incident angle of the first light beam L1 with respect to the incident surface 231. According to an embodiment, the light source lens part 220 may be integrally attached to the light source part 210 or the incident surface 231.

The light guide plate 230 is divided into a plurality of light guide blocks LGB by virtual lines. Each of the light guide blocks LGB has an incident surface 231, an opposite surface 232, a light emitting surface 233, an inclined surface 234, and side surfaces 235.

The first light beam L1 emitted from the light source part 210 is provided to the incident surface 231 via the light source lens part 220. The first light beam L1 is partially total-reflected to the opposite surface 232.

The opposite surface 232 is located opposite to the incident surface 231. The opposite surface 232 has a rounded portion, such as, for example, a convex shape with respect to the incident surface 231. For example, the opposite surface 232 has the convex shape protruding in a first direction D1 to have a focal distance at the incident surface 231 or at an area adjacent to the incident surface 231. As can be seen from FIG. 1, the first direction D1 is from the incident surface 231 toward the opposite surface 232. The opposite surface 232 has a concavo-convex shape or a zigzag shape in a cross-sectional view. The opposite surface 232 is coated with a metal, such as aluminum (Al) or silver (Ag), along the convex shape and the concavo-convex shape to reflect the first light beam L1 coming through the incident surface 231. Therefore, the opposite surface 232 with the metal converts the first light beam L1 into a second light beam L2 that is collimated.

The second light beam L2 is emitted through the light emitting surface 233. The light emitting surface 233 connects the incident surface 231 with the opposite surface 232, and is opposite to the conversion film 240. When the second light beam L2 is emitted through the light emitting surface 233, the second light beam L2 has a predetermined angle with respect to the light emitting surface 233. For example, the second light beam L2 may have an angle substantially parallel with the light emitting surface 233. The light emitting surface 233 has a first edge 233a shared with the incident surface 231 and a second edge 233b shared with the opposite surface 232. The second edge 233b has a rounded portion, such as, for example, a convex shape with respect to the first edge 233a.

The inclined surface 234 is opposite to the light emitting surface 233 and has a predetermined slope with respect to the light emitting surface 233. The slope is designed such that the second light beam L2 is easily emitted through the light emitting surface 233. The slope is designed such that an incident angle of the second light beam L2 with respect to a line substantially perpendicular to the light emitting surface 233 is smaller than a critical angle in a total reflection condition. For example, according to an embodiment, the slope may be about 0.14°. According to embodiments, the slope may be determined according to a size of the light guide plate, a zigzag pattern, a curvature of the opposite surface, etc.

The side surfaces 235 connect the light emitting surface 233 with the inclined surface 234. Since the light emitting surface 233 and the inclined surface 234 are not parallel with each other, each of the side surfaces 235 has a wedge shape in which a width of the side surface narrows from the opposite surface 232 toward the incident surface 231. The side surfaces 235 connect the incident surface 231 with the opposite surface 232.

The conversion film 240 is disposed between the display panel 100 and the light guide plate 230. The conversion film 240 includes a base substrate 241 and a plurality of prisms 242 disposed on the base substrate 241. The prisms 242 are disposed between the base substrate 241 and the light guide plate 230. Each of the prisms 242 extends along a third direction D3 substantially perpendicular to the first direction D1, and is arranged parallel with the first direction D1. For example, the prisms 242 may have a triangle prism shape, so that the conversion film 240 converts the second light beam L2 emitted through the light emitting surface 233 into a third light beam L3 that is collimated. The third light beam L3 is substantially perpendicular to a surface of the base substrate 241.

The reflecting plate 250 is disposed between the light guide plate 230 and the receiving container 300. The reflecting plate 250 reflects the first light beam L1 provided to the inclined surface 234 of the light guide plate 230 toward the opposite surface 232 or the light emitting surface 233.

The receiving container 300 defines a receiving space receiving the backlight assembly 200. Although not shown in the figure, according to an embodiment, the receiving container 300 may further include an upper frame protecting the display panel 100 and a middle frame partially supporting the backlight assembly.

Figure 3:
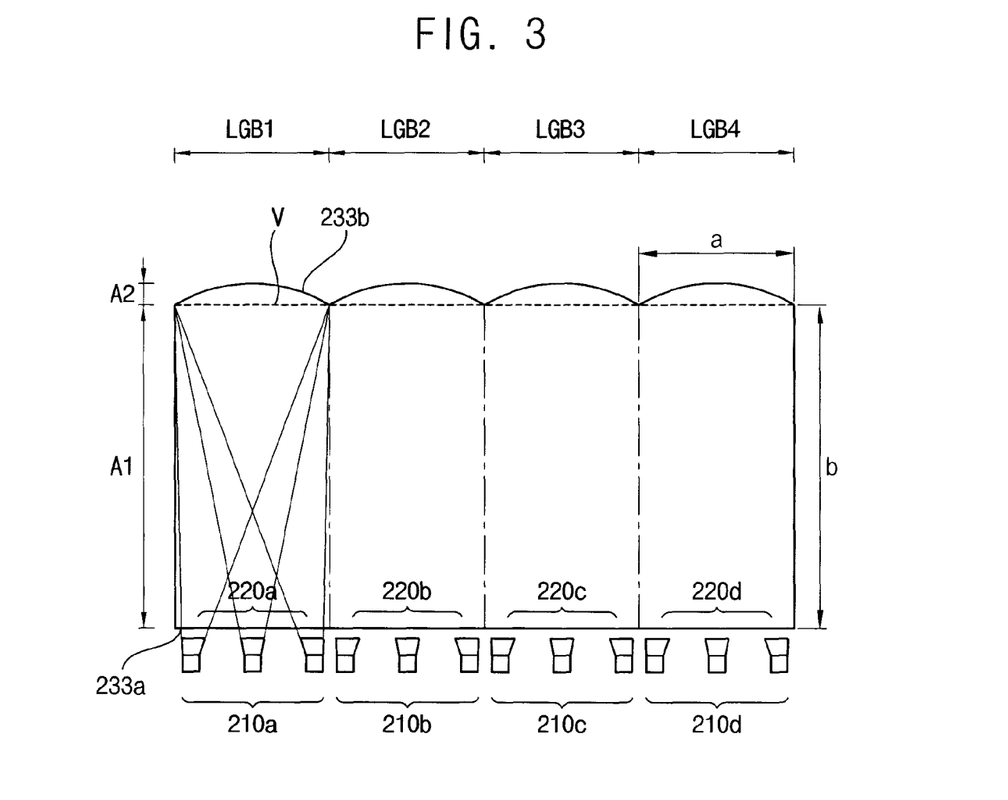
FIG. 3 is a plan view illustrating the light guide plate and the light source unit of FIG. 1.

FIG. 3 is a plan view illustrating the light guide plate and the light source unit of FIG. 1.

Referring to FIG. 1 and FIG. 3, the light guide plate 230 is divided into a plurality of the light guide blocks LGB. For example, the light guide blocks LGB may include a first light guide block LGB1, a second light guide block LGB2, a third light guide block LGB3, and a fourth light guide block LGB4.

Each of the light guide blocks LGB1, LGB2, LGB3, and LGB4 includes a first area A1 corresponding to a display area of the display panel 100 and a second area A2 corresponding to a peripheral area surrounding the display area.

The second area A2 is defined by a virtual line V. The virtual line V is parallel with the first edge 233a, and the virtual line V connects the side surfaces 235. A width of a bezel of the display apparatus 1000 depends on a distance between the second edge 233b and the virtual line V.

The width "s" of the bezel is calculated by the following equation:

$$s(3s+4b)=a^2/4 \quad \text{[Formula 1]}$$

In Formula 1, "a" is a width of a light guide block, and "b" is a length of the light guide block.

For example, when the light guide plate 230 is not divided into a plurality of light guide blocks but merely has one light guide block, a 15.6 inch display panel may have a bezel width of about 34 mm and a 46 inch display panel may have a bezel width of about 100 mm. The light guide plate of each of the 15.6 inch display panel and the 46 inch display panel is divided into a plurality of light guide blocks to decrease a distance between the second edge 233b and the virtual line V and as a consequence to decrease a bezel width.

According to an exemplary embodiment, when the light guide plate 230 is divided into 4 light guide blocks, such as the light guide blocks LGB1, LGB2, LGB3, and LGB4, the 15.6 inch display panel may have a bezel width of about 2.4 mm, and the 46 inch display panel may have a bezel width of about 7 mm.

According to an exemplary embodiment, when the light guide plate 230 is divided into 5 light guide blocks, the 15.6 inch display panel may have a bezel width of about 1.5 mm, and the 46 inch display panel may have a bezel width of about 4.5 mm.

According to an exemplary embodiment, when the light guide plate 230 is divided into 6 light guide blocks, the 15.6 inch display panel may have a bezel width of about 1.1 mm, and a 46 inch display panel may have a bezel width of about 3.1 mm.

As can be seen from the above-described exemplary embodiments, the light guide plate 230 may be divided into a plurality of light guide blocks to adjust the bezel width.

The light source part 210 includes a plurality of light source groups. For example, according to an embodiment, the light source part 210 may include a first light source group 210a corresponding to the first light guide block LGB1, a second light source group 210b corresponding to the second light guide block LGB2, a third light source group 210c corresponding to the third light guide block LGB3, and a fourth light source group 210d corresponding to the fourth light guide block LGB4. Each of the light source groups may include a plurality of light sources.

The light source lens part 220 includes a plurality of light source lens groups. For example, the light source lens part 220 may include a first light source lens group 220a corresponding to the first light source group 210a, a second light source lens group 220b corresponding to the second light source group 210b, a third light source lens group 220c corresponding to the third light source group 210c, and a fourth light source lens group 220d corresponding to the fourth light source group 210d. Each of the light source lens groups may include a plurality of light source lenses.

Figure 4:
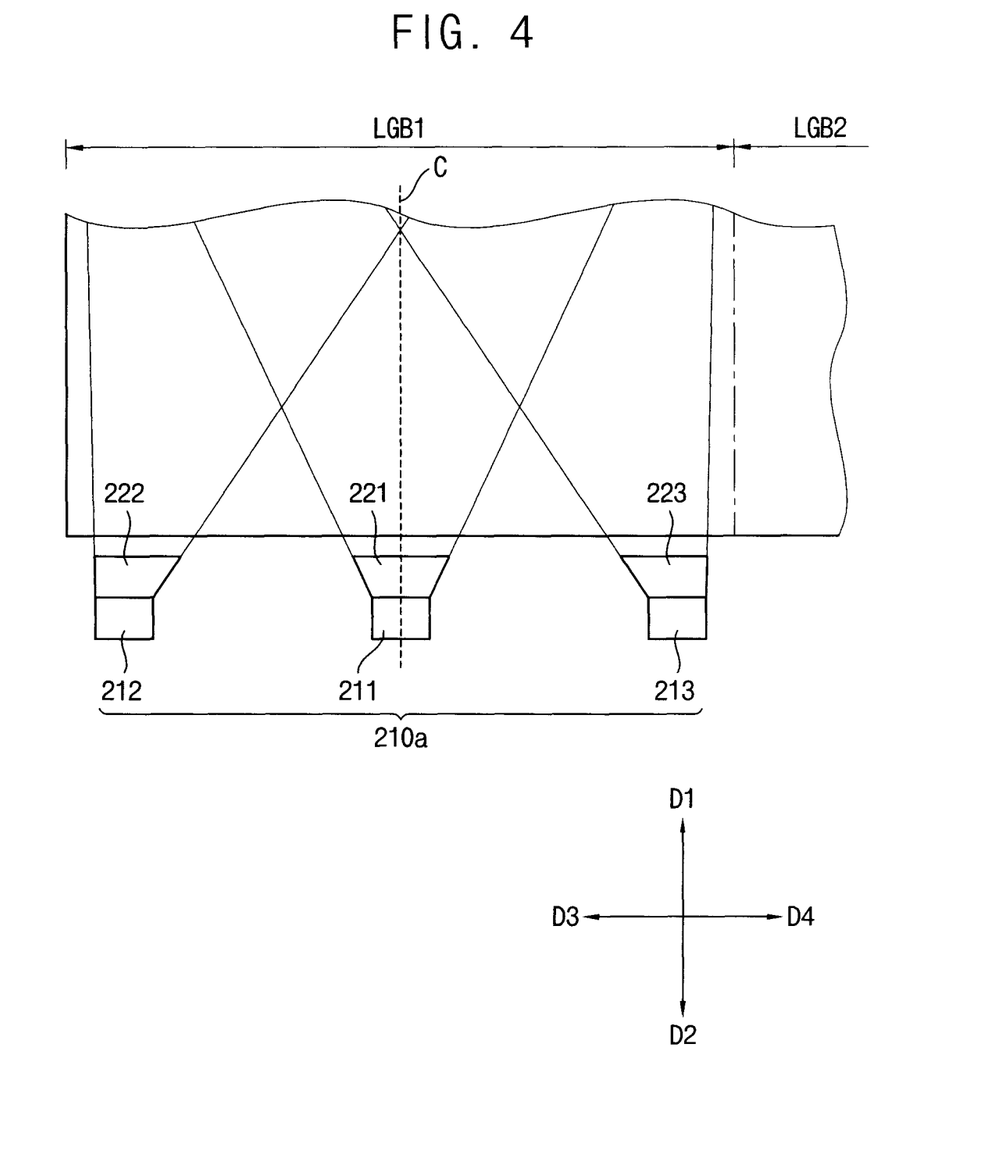
FIG. 4 is an expanded plan view illustrating the first light source group and the first light lens group of FIG. 3.

FIG. 4 is an expanded plan view illustrating the first light source group and the first light source lens group of FIG. 3.

Referring to FIG. 3 and FIG. 4, the first light source group 210a includes three light sources. The light sources include a first light source 211 disposed adjacent to a focal distance of the opposite surface 232, a second light source 212 spaced apart from the first light source 211 in the third direction D3 by a predetermined distance, and a third light source 213 spaced apart from the first light source 211 in a fourth direction D4 opposite to the third direction D3 by a predetermined distance.

The first light source lens group 220a includes a first light source lens 221 disposed between the first light source 211 and the first light guide block LGB1, a second light source lens 222 disposed between the second light source 212 and the first light guide block LGB1, and a third light source lens 223 disposed between the third light source 213 and the first light guide block LGB1.

The first to third light source lenses 221, 222, and 223 provide light emitted from the light sources 211, 212, and 213 to an opposite surface 232 of a first light guide block LGB1 via an incident surface 231 of the first light guide block LGB1.

Each of the first to third light source lenses 221, 222, and 223 may have different shapes according to a position of each of the first to third light source lenses 221, 222, and 223.

For example, the first light source lens 221 is disposed adjacent to a central line C substantially perpendicular to the light incident surface 231 of each of the light guide blocks, and has a trapezoidal shape. The first light source lens 221 is substantially aligned with the central line C and has a trapezoidal shape symmetrical with respect to the central line C to diffuse light emitted from the first light source 221 toward the opposite surface 232 of the first light guide block LGB1.

The second light source lens 222 is spaced apart from the central line C in the third direction D3, and has a trapezoidal shape. For example, the second light source lens 222 is disposed at a left side of the central line C, so that the second light source lens 222 may diffuse light emitted from the second light source 212 toward the opposite surface 232 of the first light guide block LGB1.

The third light source lens 223 is spaced apart from the central line C in the fourth direction D4, and has a trapezoidal shape. For example, the third light source lens 223 is disposed at a right side of the central line C, so that the third light source lens 223 may diffuse light emitted from the third light source 213 toward the opposite surface 232 of the first light guide block LGB1.

For example, when a distance between the second light source lens 222 and the central line C is substantially the same as a distance between the third light source lens 223 and the central line C, the second and third light source lenses 222 and 223 may be symmetrical with each other with respect to the central line C. Alternately, when the distance between the second light source lens 222 and the central line C is greater than the distance between the third light source lens 223 and the central line C, the second and third light source lenses 222 and 223 may be asymmetric with each other with respect to the central line C.

For example, each of the first to third light source lenses 221, 222, and 223 may have different shapes according to a position of each of the first to third light source lenses 221, 222, and 223 and a range of providing light from each of the first to third light source lenses 221, 222 and 223.

Although it has been described that each of the first to third light source lenses 221, 222, and 223 has the trapezoidal shape, each of the first to third light source lenses 221, 222, and 223 may have other shapes to control the range of providing light from each of the first to third light source lenses 221, 222, and 223.

Each of the second to fourth light source groups 210b, 210c, and 210d is substantially the same as the first light source group 210a, and each of the second to fourth light source lens groups 220b, 220c, and 220d is substantially the same as the first light source lens group 220a.

Figure 5:
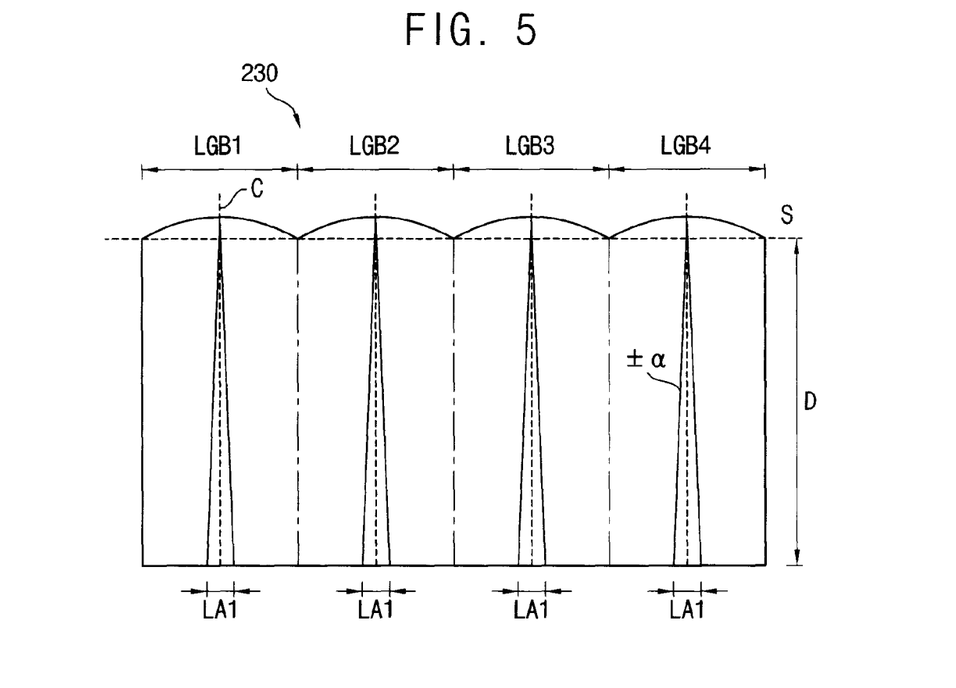
FIG. 5 is a plan view illustrating an area in which the first light source of FIG. 4 is disposed.

FIG. 5 is a plan view illustrating an area in which the first light source of FIG. 4 is disposed.

Referring to FIG. 4 and FIG. 5, the first light source 211 may be disposed in a first light source area LA1 in which a diffusion range of light emitted from the first light source 211 and reflected by the opposite surface 232 is within about ±3° with respect to the central line C.

For example, the diffusion range of the first light source area LA1 is calculated by the following equation:

Diffusion Range of First Light Source Area $LA1=N\times 2(b+s)\tan\alpha$    [Formula 2]

In Formula 2, "N" is a number of the opposite surfaces, "b" is a length of the light guide plate, "s" is a width of a bezel, and "a" is a diffusion range with respect to the central line C.

According to Formula 2, when the light guide plate is not divided into a plurality of light guide blocks, a range in which the first light source is disposed in the incident surface of the light guide plate of the 46 inch display panel may be about 71 mm. However, when the light guide plate is divided into a plurality of light guide blocks, a range in which the first light source is disposed in the incident surface of the light guide plate of the 46 inch display panel may be about 240 mm. According to the exemplary embodiments, the range in which the light sources are disposed is increased, so that the amount of light may be increased.

Figure 6A:
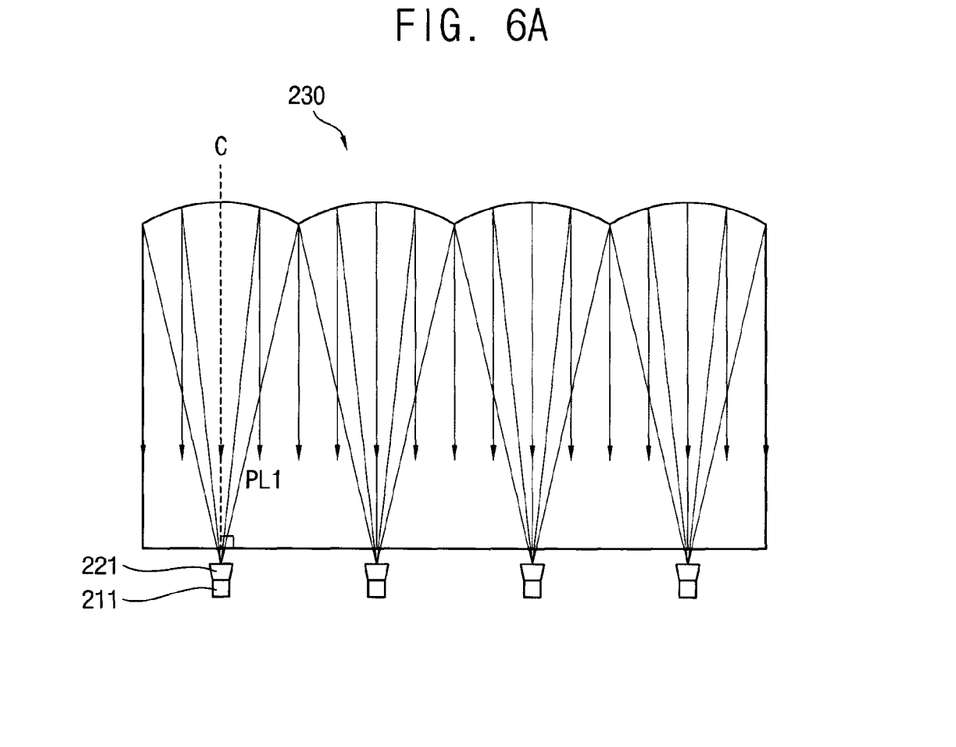
FIGS. 6A to 6C are plan views illustrating a light path of the light guide plate of FIG. 1.
Figure 6B:
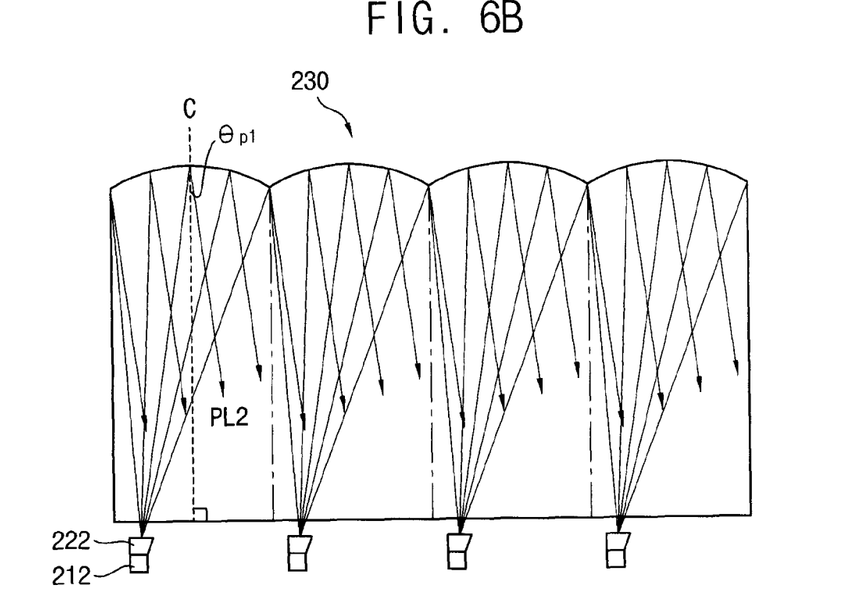
Figure 6C:
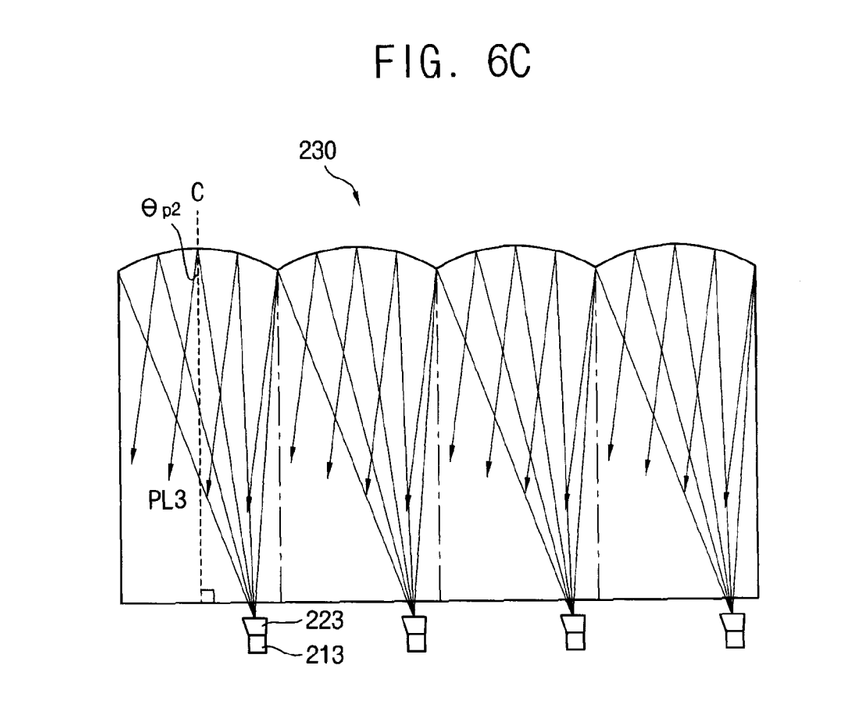

FIGS. 6A to 6C are plan views illustrating a light path in the light guide plate of FIG. 1.

Referring to FIG. 6A, the first light source 211 and the first light source lens 221 are disposed adjacent to the central line C of each of the first to fourth light guide blocks LGB1 to LGB4. The first light beams L1 emitted from the first light source 211 and refracted by the first light source lens 221 are provided to the opposite surface 232 of a corresponding light guide block, such as, for example, the light guide block LGB1, through the incident surface 231 of the corresponding first light guide block LGB1, and converted into first collimated light beams PL1 by the opposite surface 232.

The first collimated light beams PL1 advance along the central line C and pass through the light emitting surface 233. An advancing direction of the first collimated light beams PL1 is substantially parallel with the central line C. Some of the first light beams L1 emitted from the first light source 211 and refracted by the first light source lens 221 are reflected by the opposite surface 232 of the corresponding light guide block, such as, for example, the first light guide block LGB1, to be substantially parallel with the central line C.

Referring to FIG. 6B, the second light source 212 and the second light source lens 222 are spaced apart from the central line C of each of the first to fourth light guide blocks LGB1 to LGB4 in the third direction D3. Some of the first light beams L1 emitted from the second light source 212 and refracted by the second light source lens 222 are provided to the opposite surface 232 of a corresponding light guide block, such as, for example, the first light guide block LGB1, through the incident surface 231 of the corresponding light guide block and converted into second collimated light beams PL2 by the opposite surface 232.

The second collimated light beams PL2 advance in a direction inclined by a first angle $\theta_{p1}$ with respect to the central line C and pass through the light emitting surface 233. An advancing direction of the second collimated light beams PL2 is inclined by the first angle $\theta_{p1}$ with respect to the central line C.

Referring to FIG. 6C, the third light source 213 and the third light source lens 223 are spaced apart from the central line C of each of the first to fourth light guide blocks LGB1 to LGB4 in the fourth direction D4. Some of the first light beams L1 emitted from the third light source 213 and refracted by the third light source lens 223 are provided to the opposite surface 232 of a corresponding light guide block, such as, for example, the light guide block LGB1, through the incident surface 231 of the corresponding light guide block LGB and converted into third collimated light beams PL3 by the opposite surface 232.

The third collimated light beams PL3 advance in a direction inclined by a second angle $-\theta_{p1}$ with respect to the central line C and pass through the light emitting surface 233. An advancing direction of the third collimated light beams PL3 is inclined by the second angle $-\theta_{p1}$ with respect to the central line C.

For example, when a distance between the second light source 212 and the first light source 211 is the same or substantially the same as a distance between the third light source 213 and the first light source 211, the first angle $\theta_{p1}$ may be equal or substantially equal to an absolute value of the second angle $-\theta_{p1}$. Alternately, when the distance between the second light source 212 and the first light source 211 is different from the distance between the third light source 213 and the first light source 211, the first angle $\theta_{p1}$ may be different from the absolute value of the second angle $-\theta_{p1}$. Thus, according to an exemplary embodiment, the display panel 100 may have a viewing angle of up to {the first angle $\theta_{p1}$–the second angle $-\theta_{p1}$} using the first to third collimated light beams PL1, PL2, and PL3. For example, the display apparatus 1000 drives the first light source 211 to embody a relatively narrow viewing angle using the first collimated light PL1 substantially parallel with the central line C. The display apparatus 1000 drives all of the first to third light sources 211, 212, and 213 to embody a relatively wide viewing angle of up to {the first angle $\theta_{p1}$–the second angle $-\theta_{p1}$} with respect to the central line C in plan view using the first to third collimated light beams PL1, PL2, and PL3.

According to an exemplary embodiment, the display apparatus 1000 may display a stereoscopic image using the second and third collimated light beams PL2 and PL3. For example, the display apparatus 1000 may generate a left eye image using the second collimated light beams PL2 and a right eye image using the third collimated light beams PL3. The display apparatus 1000 may embody the stereoscopic image by a difference between the left eye image and the right eye image.

According to an exemplary embodiment, the light guide plate 220 is divided into a plurality of light guide blocks LGB1 to LGB4, so that a width of a bezel of the display apparatus 1000 may be decreased. The display apparatus 1000 may control a range of the viewing angle and be employed as a stereoscopic apparatus displaying stereoscopic images.

Figure 7:
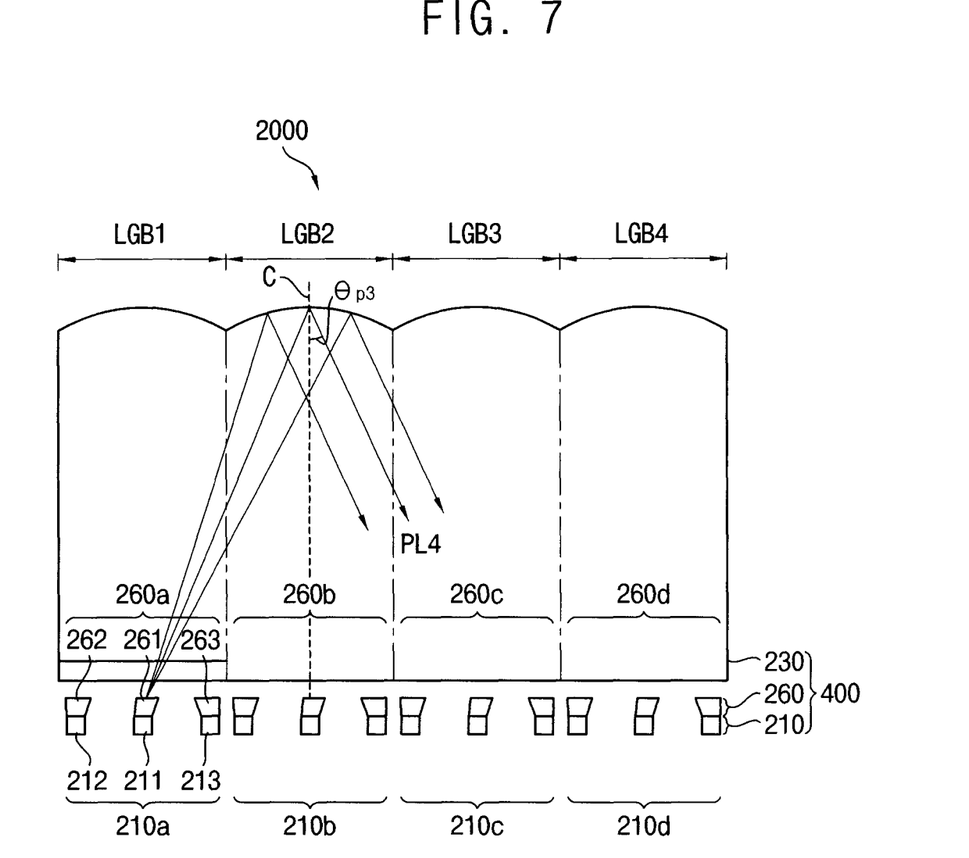
FIG. 7 is a plan view illustrating a light guide plate of a display apparatus according to an exemplary embodiment of the present invention.
Figure 8:
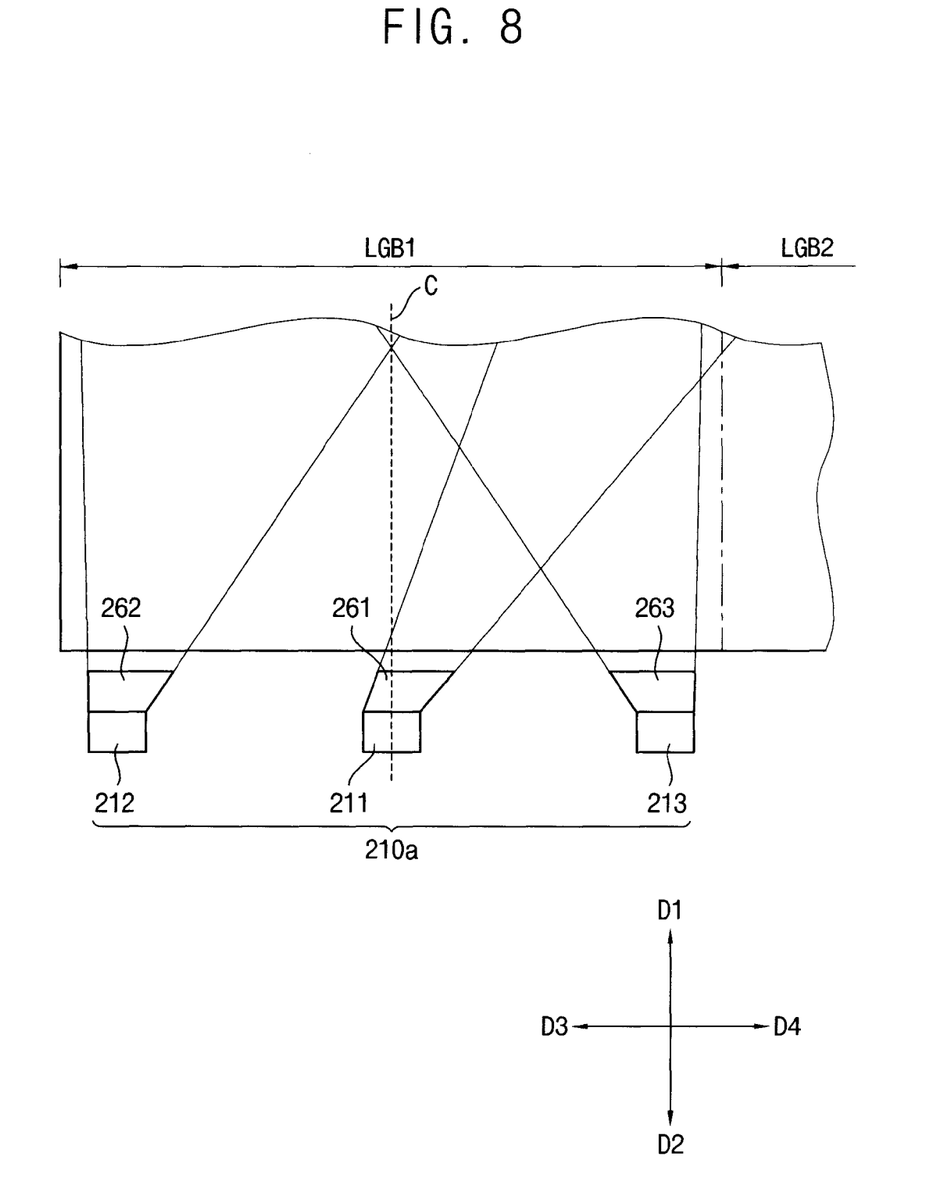
FIG. 8 is an expanded plan view illustrating the first light source group and the first light source lens group of FIG. 7.

FIG. 7 is a plan view illustrating a light guide plate of a display apparatus according to an exemplary embodiment of the present invention. FIG. 8 is an expanded plan view illustrating the first light source group and the first light source lens group of FIG. 7.

A display apparatus 2000 is substantially the same as the display apparatus 1000 of FIG. 1 except for a light path in the light guide plate.

Referring to FIG. 7 and FIG. 8, a backlight assembly 400 of the display apparatus 2000 includes a light guide plate 230, a light source part 210, and a light source lens part 260.

The light source lens part 260 includes a plurality of light source lens groups. For example, the light source lens part 260 may include a first light source lens group 260a corresponding to the first light source group 210a, a second light source lens group 260b corresponding to the second light source group 210b, a third light source lens group 260c corresponding to the third light source group 210c, and a fourth light source lens group 260d corresponding to the fourth light source group 210d. Each of the light source lens groups may include a plurality of light source lenses.

For example, the first light source lens group 260a may include a first light source lens 261 disposed between the first light source 211 and the light guide plate 230, a second light source lens 262 disposed between the second light source 212 and the light guide plate 230, and a third light source lens 263 disposed between the third light source 213 and the light guide plate 230.

At least one of the first to third light source lenses 261, 262, and 263 provides light beams emitted from the light sources 211, 212, and 213 via an incident surface 231 of a corresponding light guide block, such as, for example, the first light guide block LGB1, to an opposite surface 232 of a neighboring light guide block, such as, for example, the second light guide block LGB2.

Each of the first to third light source lenses 261, 262, and 263 may have different shapes according to a position of each of the first to third light source lenses 221, 222, and 223.

For example, the first light source lens 261 is disposed adjacent to the central line C at the incident surface of the first light guide block LGB1, so that light beams provided from the first light source 211 are provided to the opposite surface 232 of the second light guide block LGB2 adjacent to the first light guide block LGB1 through the first light source lens 261. The first light source lens 261 may have a trapezoidal shape to provide the light beams to the opposite surface 232 of the second light guide block LGB2. A diffusion range of the light beams provided through the first light source lens 261 is substantially the same as a width of the opposite surface 232 of the second light guide block LGB2.

Therefore, the first light beams L1 passing through the first light source lens 261 are provided to the opposite surface 232 of the second light guide block LGB2 via the incident surface 231 of the first light guide block LGB1 and converted into the first collimated light beams PL4 by the opposite surface 232 of the second light guide block LGB2. The first collimated light beams PL4 have a first angle $\theta_{p3}$ with respect to the central line C substantially perpendicular to the incident surface 231 of the second light guide block LGB2.

The first light beams L1 passing through the first light source lens 261 are provided to the second light guide block LGB2, so that the first collimated light beams PL4 may have the first angle $\theta_{p3}$ wider than the first angle $\theta_{p1}$ according to the previous exemplary embodiment described in connection with FIG. 6

To provide the first light beams L1 passing through the second and third light source lenses 262 and 263 to the opposite surface 232 of the second light guide block LGB2 via the incident surface 231 of the first light guide block LGB1 like the first light guide source lens 261, shapes of the second and third light source lenses 262 and 263 may be changed.

Alternately, to provide the first light beams L1 passing through the second and third light source lenses 262 and 263 to the opposite surface 232 of the first light guide block LGB1 via the incident surface 231 of the first light guide block LGB1, shapes of the second and third light source lenses 262 and 263 may be changed.

The first to third light source lenses 261, 262, and 263 may have different shapes from each other according to a position of each of the first to third light source lenses 261, 262, and 263 and according to a diffusion range of light beams passing through the first to third light source lenses 261, 262, and 263.

According to an exemplary embodiment, each of the first to third light source lenses 261, 262, and 263 has a trapezoidal shape, but alternatively, each of the first to third light source lenses 261, 262, and 263 may have other shapes capable of controlling a diffusion range of light.

According to an exemplary embodiment, at least one light source lens of the first light source lens group 260a provides light to the opposite surface 232 of the second light guide block LGB2, so that a wide viewing angle may be obtained.

Figure 9:
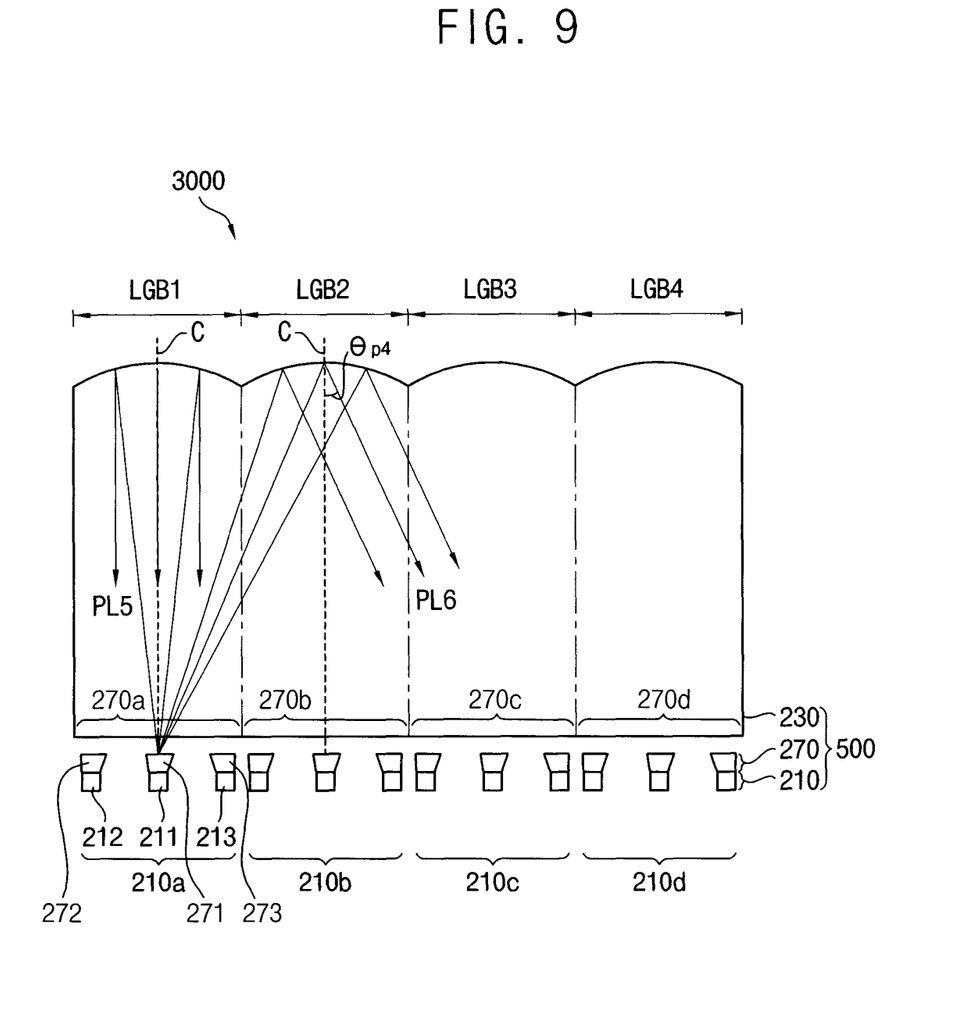
FIG. 9 is a plan view illustrating a light guide plate of a display apparatus according to an exemplary embodiment of the present invention.
Figure 10:
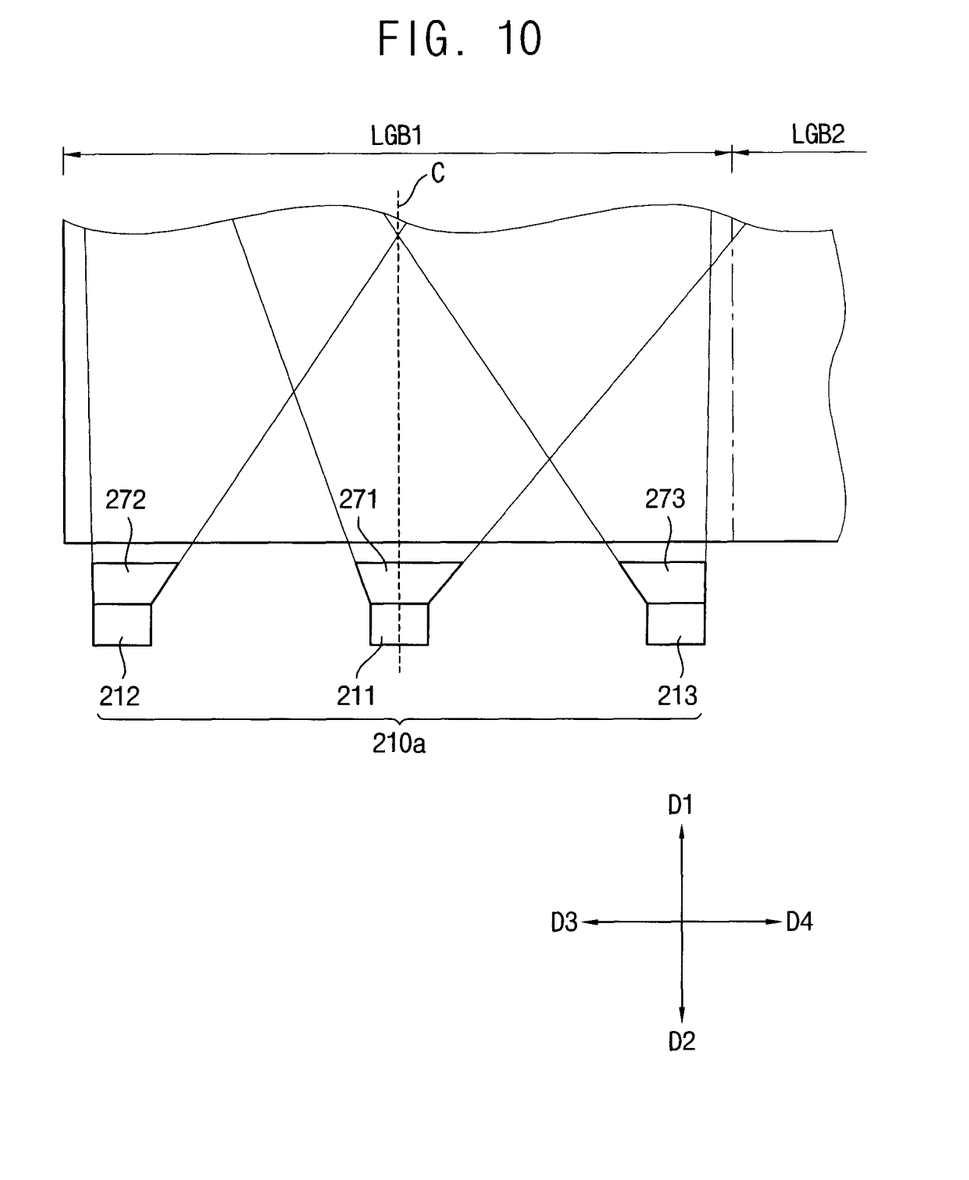
FIG. 10 is an expanded plan view illustrating the first light source group and the first light source lens group of FIG. 9.

FIG. 9 is a plan view illustrating a light guide plate of a display apparatus according to an exemplary embodiment of the present invention. FIG. 10 is an expanded plan view illustrating the first light source group and the first light source lens group of FIG. 9.

A display apparatus 3000 is substantially the same as the display apparatus 1000 of FIG. 1 except for a light path in the light guide plate.

Referring to FIG. 9 and FIG. 10, a backlight assembly 500 of the display apparatus 3000 includes a light guide plate 230, a light source part 210, and a light source lens part 270.

The light source lens part 270 includes a plurality of light source lens groups. For example, the light source lens part 270 includes a first light source lens group 270a corresponding to the first light source group 210a, a second light source lens group 270b corresponding to the second light source group 210b, a third light source lens group 270c corresponding to the third light source group 210c, and a fourth light source lens group 270d corresponding to the fourth light source group 210d. Each of the light source lens groups may include a plurality of light source lenses.

For example, the first light source lens group 270a includes a first light source lens 271 disposed between the first light source 211 and the light guide plate 230, a second light source lens 272 disposed between the second light source 212 and the light guide plate 230, and a third light source lens 273 disposed between the third light source 213 and the light guide plate 230.

Light beams emitted from the first to third light sources 211, 212, and 213 and passing through at least one of the first to third light source lenses 271, 272, and 273 are incident to the incident surface 231 of a corresponding light guide block LGB, such as, for example, the first light guide block LGB1, and are provided to the opposite surfaces 232 of the corresponding light guide block, such as, for example, the first light guide block LGB1, and a neighboring light guide block, such as, for example, the second light guide block LGB2 adjacent to the first light guide block LGB1.

The first to third light source lenses 271, 272, and 273 may have different shapes from each other according to a position of each of the first to third light source lenses 271, 272, and 273.

For example, the first light source lens 271 is disposed adjacent to the central line C at the incident surface of the first light guide block LGB1, so that the light beams provided from the first light source 211 are provided to the opposite surfaces 232 of the first light guide block LGB1 and the second light guide block LGB2 through the first light source lens 271. Thus, the first light source lens 271 may have a trapezoidal shape to provide the light beams to the opposite surfaces 232 of the first light guide block LGB1 and the second light guide block LGB2. A diffusion range of the light beams provided through the first light source lens 271 is the same or substantially the same as a width of the opposite surfaces 232 of the first light guide block LGB1 and the second light guide block LGB2.

Therefore, the first light beams L1 passing through the first light source lens 261 are provided to the opposite surfaces 232 of the first light guide block LGB1 and the second light guide block LGB2 via the incident surface 231 of the first light guide block LGB1 and converted into first collimated light beams PL5 by the opposite surface 232 of the first light guide block LGB1 and second collimated light beams PL6 by the opposite surface 232 of the second light guide block LGB2. The first collimated light beams PL5 are substantially parallel with the central line C and the second collimated light beams PL6 have a first angle $\theta_{p4}$ with respect to the central line C in plan view.

To provide the first light beams L1 passing through the second and third light source lenses 272 and 273 to the opposite surfaces 232 of the first light guide block LGB1 and the second light guide block LGB2 via the incident surface 231 of the first light guide block LGB1 like the first light guide source lens 271, shapes of the second and third light source lenses 272 and 273 may be changed.

Alternately, to provide the first light beams L1 passing through the second and third light source lenses 272 and 273 to the opposite surface 232 of the first light guide block LGB1 via the incident surface 231 of the first light guide block LGB1, shapes of the second and third light source lenses 272 and 273 may be changed.

Therefore, the first to third light source lenses 271, 272, and 273 may have different shapes from each other according to a position of each of the first to third light source lenses 271, 272, and 273 and according to a diffusion range of the light beams passing through the first to third light source lenses 271, 272, and 273.

According to an exemplary embodiment, each of the first to third light source lenses 271, 272, and 273 has a trapezoidal shape, but alternatively, each of the first to third light source lenses 271, 272, and 273 may have various shapes capable of controlling a diffusion range of light.

According to an exemplary embodiment, at least one light source lens of the first light source lens group 270a provides light to the opposite surface 232 of the first light guide block LGB1 and the second light guide block LGB2, so that various viewing angles may be obtained even when only one light source is employed.

Figure 11:
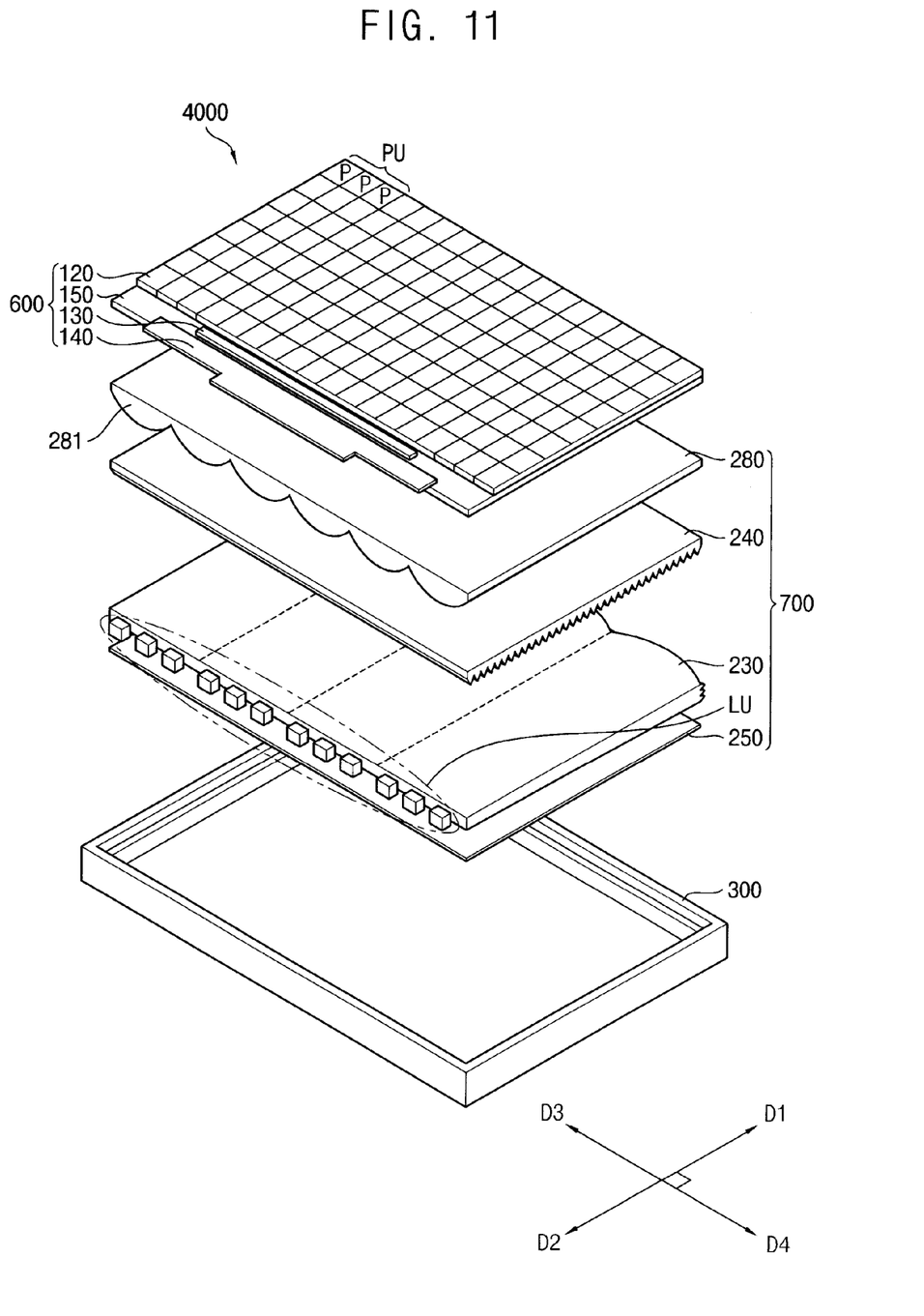
FIG. 11 is an exploded perspective view illustrating a display apparatus according to an exemplary embodiment of the present invention.
Figure 12:
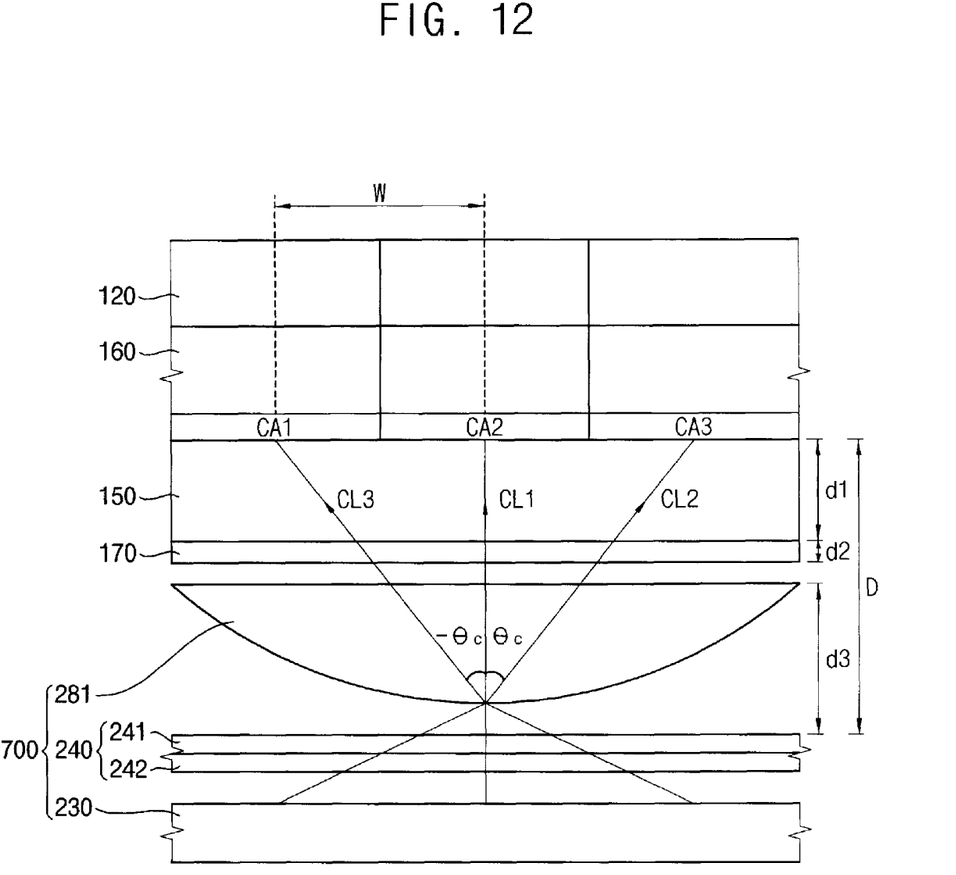
FIG. 12 is a cross-sectional view illustrating the display apparatus of FIG. 11.

FIG. 11 is an exploded perspective view illustrating a display apparatus according to an exemplary embodiment of the present invention. FIG. 12 is a cross-sectional view illustrating the display apparatus of FIG. 11.

A display apparatus 4000 is substantially the same as the display 1000 apparatus of FIG. 1 except that the display apparatus 4000 includes a lenticular lens instead of a color filter layer.

Referring to FIG. 11 and FIG. 12, the display apparatus 4000 includes a display panel 600, a backlight assembly 700, and a receiving container 300. The display apparatus 4000 does not include a color filter layer.

The display panel 600 includes a first substrate 150, a second substrate 120 opposite to the first substrate 150, a driving part 130 that drives gate lines (not shown) and data lines (not shown) and is formed between the first and second substrate 150 and 120, and a printed circuit substrate 140 electrically connected to the driving part 130. According to an embodiment, the display panel 600 may further include a polarizing plate (not shown).

The display panel 600 includes a plurality of unit pixels PU arranged in a matrix shape. Each of the unit pixels PU includes a plurality of subpixels P adjacent to each other. For example, each of the unit pixels PU includes three subpixels P adjacent to each other along the fourth direction D4.

The backlight assembly 700 includes a light source unit LU, a light guide plate 230, a conversion film 240, and a lenticular lens 280. The backlight assembly 700 may further include a reflecting plate 250. The backlight assembly 700 is disposed under the display panel 600 to provide light to the display panel 600.

The light source unit LU may include a light source part and a light source lens part. The light source part includes a plurality of light source groups, and each of the light source groups includes a plurality of light sources. The light sources may be point light sources emitting light having colors different from each other. For example, the light sources may be light emitting diodes emitting red light, green light, and blue light.

The lenticular lens 280 is disposed between the display panel 600 and the conversion film 240. The lenticular lens 280 has a plurality of convex parts 281. A convex part 241 may correspond to a unit pixel PU. The lenticular lens 280 concentrates light beams provided in various angles onto a plurality of areas.

Referring FIG. 11 and FIG. 12, the convex part 281 concentrates each of light beams having different colors and provided at the various angles onto each of a first color area CA1, a second color area CA2, and a third color area CA3 of the first substrate 150.

For example, a first color light beam CL1 provided from the backlight assembly 700 is concentrated onto the second color area CA2 by the convex part 281, a second color light beam CL2 provided from the backlight assembly 700 is concentrated onto the third color area CA3 by the convex part 281, and a third color light beam CL3 provided from the backlight assembly 700 is concentrated onto the first color area CA1 by the convex part 281.

The second color light beam CL2 is controlled to have a second incident angle θc with respect to a first incident angle 0° of the first color light beam CL1 and the third color light beam CL3 is controlled to have a third incident angle −θc with respect to the first incident angle 0° of the first color light beam CL1, so that the second and third color light beams CL2 and CL3 may be correctly concentrated onto the third and first color area CA3 and CA1, respectively. The second and third incident angles θc and −θc are calculated by the following equation:

$$\tan(-)\theta c = W/D \qquad \text{[Formula 3]}$$

In Formula 3, "W" is a width of a unit pixel divided by 3, and "D" is a focal distance. The focal distance D may be the sum of a thickness d1 of the first substrate 110, a thickness d2 of a polarization plate 170, and a thickness d3 of the convex part 281.

First to third light sources emitting the first to third color light beams CL1, CL2, and CL3 are disposed adjacent to an incident surface 231 of the light guide plate 230, so that the first to third color light beams CL1, CL2, and CL3 may have the first to third incident angles 0, θc, and −θc respectively.

The display apparatus 4000 includes the lenticular lens 280 instead of the color filter layer, so that a loss of light due to the color filter layer may be prevented. Thus, a light efficiency of the display apparatus 4000 may be improved.

According to an embodiment, the display apparatus 4000 may include a structure where a focal distance of the convex part 281 is between the liquid crystal layer 160 and the second substrate 120.

The display apparatus 4000 may include a light source lens part according to the previous exemplary embodiment described in connection with FIG. 7 and FIG. 9, so that a light path in the light guide plate may be substantially the same as that according to the exemplary embodiment described in connection with FIG. 7 and FIG. 9.

According to embodiments, the display apparatus 4000 may have various light paths in the light guide plate by changing the shapes of the light source lenses and the light path in the light guide plate according to the previous exemplary embodiment described in connection with FIG. 7 and FIG. 9

According to the present exemplary embodiment, a light guide plate has an opposite surface located opposite to an incident surface and having a convex shape, and the opposite surface converts light provided through the incident surface into collimated light, so that a viewing angle of the display apparatus may be easily controlled and a stereoscopic image may be easily displayed.

The light guide plate is divided into a plurality of light guide blocks, so that a size of a bezel may be effectively decreased.

A light source adjacent to the first light guide block provides light to at least one of a first light guide block and a second light guide block adjacent to the first light guide block, so that the viewing angle may be variously controlled.

The foregoing is illustrative of the embodiments of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims.

What is claimed is:

1. A backlight assembly comprising:
a light source part generating a first light beam; and
a light guide plate having a plurality of light guide blocks, each of the light guide blocks having a light incident surface, an opposite surface, a light emitting surface, and an inclined surface, wherein the light incident surface receives the first light beam, wherein the opposite surface is located opposite to the light incident surface and has a convex shape with respect to the light incident surface and wherein the opposite surface reflects the first light beam and converts the first light beam into a second light beam that is collimated and passes through the light emitting surface, wherein the inclined surface is inclined with respect to the light emitting surface, wherein the light source part comprises a plurality of light source groups respectively corresponding to the light guide blocks, wherein the light source groups are disposed adjacent to the light incident surfaces of the light guide blocks, respectively, and wherein each of the light source groups comprises a first light source adjacent to a focal distance of the opposite surface.

2. The backlight assembly of claim 1, further comprising:
a conversion film on the light guide plate, wherein the conversion film converts the second light beam into a third light beam, wherein the third light beam is collimated and advances in a direction substantially perpendicular to the light emitting surface.

3. The backlight assembly of claim 2, wherein the conversion film comprises:
a base substrate; and
a plurality of prisms on the base substrate, wherein the plurality of prisms face the light guide plate and convert the second light beam into the third light beam.

4. The backlight assembly of claim 1, wherein the opposite surface has a concavo-convex shape in a cross-sectional view.

5. The backlight assembly of claim 1, wherein the opposite surface reflects light from the first light source and converts the light into a first collimated light beam.

6. The backlight assembly of claim 5, wherein each of the light source groups further comprises a second light source spaced apart from the first light source in a first direction and a third light source spaced apart from the first, light source in a second direction opposite to the first direction, wherein
the opposite surface reflects light from the second light source and converts the light into a second collimated light beam that is inclined with respect to the first collimated light beam by a first angle, and
the opposite surface reflects light from the third light source and converts the light into a third collimated light beam that is inclined with respect to the first collimated light beam by a second angle.

7. The backlight assembly of claim 1, further comprising:
a plurality of light source lenses between the light source part and each of the light guide blocks, wherein each of the light source lenses provides the first light beam to an opposite surface of a light guide block corresponding to each of the light source lenses.

8. The backlight assembly of claim 1, further comprising:
a plurality of light source lenses between the light source part and each of the light guide blocks, wherein each of the light source lenses provides the first light beam to an opposite surface of a first light guide block, wherein the first light guide block is adjacent to a second light guide block corresponding to each of the light source lenses.

9. The backlight assembly of claim 1, further comprising:
a plurality of light source lenses between the light source part and each of the light guide blocks, wherein each of the light source lenses provides the first light beam to an opposite surface of a first light guide block corresponding to each of the light source lenses and provides the first light beam to an opposite surface of a second light guide block adjacent to the first light guide block.

10. The backlight assembly of claim 1, wherein the light source part comprises a plurality of light source groups, each of the plurality of light source groups corresponding to each of the light guide blocks, wherein
each of the light source groups comprises a first light source, a second light source, and a third light source, and
each of the first, second, and third light sources emits one of a red light beam, a green light beam, and a blue light beam.

11. The backlight assembly of claim 10, further comprising:
a conversion film disposed on the light guide plate; and a lenticular film on the conversion film, wherein the lenticular film provides the red light, the green light, and the blue light to areas different from each other, respectively.

12. A display apparatus comprising:
a backlight assembly comprising a light source part and a light guide plate having a plurality of light guide blocks, wherein the light source part generates a first light beam, and wherein each of the light guide blocks has a light incident surface, an opposite surface, a light emitting surface, and an inclined surface, wherein the light incident surface receives the first light beam, wherein the opposite surface is located opposite to the light incident surface and has a convex shape with respect to the light incident surface and wherein the opposite surface reflects the first light beam and converts the first light beam into a second light beam that is collimated and passes through the light emitting surface, wherein the inclined surface is inclined with respect to the light emitting surface; and
a display panel over the backlight assembly, wherein the display panel displays an image, wherein the light source part comprises a plurality of light source groups respectively corresponding to the light guide blocks, wherein the light source groups are disposed adjacent to the light incident surfaces of the light guide blocks, respectively, and wherein each of the light source groups comprises a first light source adjacent to a focal distance of the opposite surface.

13. The display apparatus of claim 12, further comprising:
a conversion film including a base substrate and a plurality of prisms, wherein the conversion film converts the second light beam into a third light beam, wherein the prisms are disposed on the base substrate and face the light guide plate.

14. The display apparatus of claim 12, wherein
each of the light source groups comprises a first light source, a second light source, and a third light source, and
each of the first, second, and third light sources emits one of a red light beam, a green light beam, and a blue light beam.

15. The display apparatus of claim 14, wherein the display panel comprises a plurality of pixel units, and wherein the display apparatus further comprises a lenticular lens between the backlight assembly and the display panel, wherein the lenticular lens provides the red light beam, the green light beam, and the blue light beam to subpixels of each of the pixel units, respectively.

16. The display apparatus of claim 14, further comprising:
a plurality of light source lenses between the light source part and each of the light guide blocks, wherein each of the light source lenses provides each of the red, green, and blue light beams to an opposite surface of a light guide block corresponding to each of the light source lenses.

17. The display apparatus of claim 14, further comprising:
a plurality of light source lenses between the light source part and each of the light guide blocks, wherein each of the light source lenses provides each of the red, green, and blue light beams to an opposite surface of a first light guide block, wherein the first light guide block is adjacent to a second light guide block corresponding to each of the light source lenses.

18. The display apparatus of claim 14, further comprising:
a plurality of light source lenses between the light source part and each of the light guide blocks, wherein each of the lights source lenses provides each of the red, green, and blue light beams to an opposite surface of a first light guide block corresponding to each of the light source lenses and to an opposite surface of a second light guide block, wherein the second light guide block is adjacent to the first light guide block.

19. A backlight assembly comprising:
a light source emitting a first light beam; and
a light guide plate including a plurality of light guide blocks, wherein each of the light guide blocks include an incident surface, an opposite surface that is located opposite to the incident surface and has a rounded portion, a light emitting surface, and an inclined surface located opposite to the light emitting surface, wherein the first light beam passes through the incident surface and is reflected by the rounded portion to be a collimated second light beam that passes through the light emitting surface to an outside of the light guide plate, wherein the light source comprises a plurality of light source groups respectively corresponding to the light guide blocks, wherein the light source groups are disposed adjacent to the light incident surfaces of the light guide blocks, respectively, and wherein each of the light source groups comprises a first light source adjacent to a focal distance of the opposite surface.

* * * * *